US011067232B2

United States Patent
Nijkamp et al.

(10) Patent No.: US 11,067,232 B2
(45) Date of Patent: Jul. 20, 2021

(54) MODULAR CEILING KIT

(71) Applicant: SIGNIFY HOLDING B.V., Eindhoven (NL)

(72) Inventors: Rick Gerhardus Nijkamp, Amsterdam (NL); Silvia Maria Booij, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 36 days.

(21) Appl. No.: 16/621,878

(22) PCT Filed: Jun. 7, 2018

(86) PCT No.: PCT/EP2018/064969
§ 371 (c)(1),
(2) Date: Dec. 12, 2019

(87) PCT Pub. No.: WO2018/228905
PCT Pub. Date: Dec. 20, 2018

(65) Prior Publication Data
US 2021/0148529 A1 May 20, 2021

(30) Foreign Application Priority Data

Jun. 15, 2017 (EP) .................... 17176157

(51) Int. Cl.
*F21S 8/02* (2006.01)
*F21V 21/04* (2006.01)
(Continued)

(52) U.S. Cl.
CPC ............... *F21S 8/026* (2013.01); *F21V 3/02* (2013.01); *F21V 3/049* (2013.01); *F21V 21/048* (2013.01);
(Continued)

(58) Field of Classification Search
CPC ... F21S 8/026; F21S 8/02; F21V 21/048–049; F21V 3/02; F21V 3/049;
(Continued)

(56) References Cited

U.S. PATENT DOCUMENTS

2005/0265016 A1 12/2005 Rappaport
2010/0039821 A1 2/2010 Oh
(Continued)

FOREIGN PATENT DOCUMENTS

DE 2554773 B1 5/1977
DE 112013004356 T5 6/2018
(Continued)

*Primary Examiner* — Joseph L Williams
*Assistant Examiner* — Jose M Diaz
(74) *Attorney, Agent, or Firm* — Daniel J. Piotrowski

(57) ABSTRACT

A modular ceiling kit comprising a luminaire arrangement and a mounting frame (12) is disclosed. The luminaire arrangement has a luminaire (20) with a first light exit window (22) framed by a rim (25). The mounting frame (12) has an aperture (13) for receiving the luminaire (20). The luminaire arrangement also has a component (30) that is mountable in between the mounting frame (12) and the luminaire (20). The component (30) has a first light exit window (22) framed by a rim (25). The component (30) comprises a second light exit window (35) larger than the first light exit window (22), the second light exit window (35) being delimited by a side wall arrangement (33) extending away from the second light exit window (35), wherein the component (30) is dimensioned such that when the component (30) is positioned on the luminaire (20), the component (30) obscures the rim (25) and the sidewall arrangement (33) creates a clearance (40) between the first light exit window (22) and the second light exit window (35).

13 Claims, 5 Drawing Sheets

(51) Int. Cl.
*F21V 3/04* (2018.01)
*F21V 3/02* (2006.01)
*F21Y 115/10* (2016.01)

(52) U.S. Cl.
CPC ......... *F21V 21/049* (2013.01); *F21Y 2115/10* (2016.08)

(58) Field of Classification Search
CPC ........ F21V 15/015; F21V 15/04; F21V 17/04; F21V 17/12; F21V 17/105; F21V 17/108; F21V 17/101; F21V 3/00; F21Y 2115/10
See application file for complete search history.

(56) References Cited

U.S. PATENT DOCUMENTS

| | | |
|---|---|---|
| 2012/0176784 A1 | 7/2012 | Peifer et al. |
| 2012/0250309 A1 | 10/2012 | Handsaker |
| 2013/0148349 A1 | 6/2013 | Pasqualini et al. |
| 2016/0208998 A1 | 7/2016 | Greinke |

FOREIGN PATENT DOCUMENTS

| | | |
|---|---|---|
| FR | 2683616 A1 | 5/1993 |
| GB | 2537088 A | 10/2016 |
| KR | 101459273 B1 | 11/2014 |

MODULAR CEILING KIT

CROSS-REFERENCE TO PRIOR APPLICATIONS

This application is the U.S. National Phase application under 35 U.S.C. § 371 of International Application No. PCT/EP2018/064969, filed on Jun. 7, 2018 which claims the benefit of European Patent Application No. 17176157.0, filed on Jun. 15, 2017. These applications are hereby incorporated by reference herein.

FIELD OF THE INVENTION

The present invention relates to a modular ceiling kit comprising a luminaire arrangement and a mounting frame, wherein the luminaire arrangement comprises a luminaire having a first light exit window framed by a rim, and wherein the luminaire arrangement further comprises a component having a second light exit window larger than the first light exit window.

BACKGROUND OF THE INVENTION

Ceiling-mounted luminaires are commonplace in illuminating spaces, such as office spaces or the like. Such luminaires may be suspended from the ceiling or may be integrated in a modular ceiling, also referred to as a suspended ceiling, which typically comprises a mounting frame in which the ceiling tiles and one or more of such luminaires are suspended.

With the advent of solid state lighting (SSL) elements such as LEDs, such luminaires may comprise (planar) optical components such as a light guide and a reflector in order to homogenize the light emitted by the SSL elements. This is because SSL elements typically act as approximate point light sources, which would lead to a luminous distribution that is perceived is unpleasant without such homogenization, due to the fact that an observer of the luminaire would observe rather bright point sources rather than a homogeneously lit surface. To further obscure such SSL elements from view, so-called edge-lit luminaires are becoming increasingly popular, in which the SSL elements are arranged along one or more edges of the light guide. The light guide may further comprise a diffuser in between the light guide and a light exit window of the luminaire to further diffuse its luminous output in order to further control the luminous output characteristics of the luminaire.

In order to retain the various planar optical components of the luminaire, e.g. the reflector, light guide and diffuser if present, the luminaire typically comprises a frame or housing that wraps around the optical components, thereby forming a rim around the light exit window of the luminaire that covers the perimeter of these optical components. This is aesthetically unsatisfactory as such a rim is clearly visible as a dark region around the light exit window when the luminaire is in use. This is particularly the case when the luminaire is suspended in a modular ceiling, as this rim typically extends beyond the mounting frame of such a modular ceiling and is therefore visible as part of the luminaire. However, even for free-hanging luminaires, i.e. luminaires suspended from a ceiling, such a visible rim can be unsightly.

Products are available that can alter the appearance of such luminaires. For example, the Fluorescent Gallery Company in Aliso Viejo, Calif. 92656, USA (https://www.fluorescentgallery.com/), manufactures decorative light panels that can be retrofitted to fluorescent and LED-based suspended ceiling luminaires by sandwiching the planar panel in between the luminaire and its mounting frame. However, when used with a luminaire having a rim around its light exit window as described above, the rim remains visible as a dark region in the decorative light panel.

US-2005/265016 discloses a universal trim piece for a recessed light, which includes a mounting side disposed toward a ceiling, and which has an aperture sized to conform with a dimension of an open side of a housing for a recessed light. A decorative side is disposed opposite the mounting side and a universal engagement member, disposed on the mounting side, removably engages a trim ring on the recessed light and secure the universal trim piece to the housing and proximate to the ceiling.

SUMMARY OF THE INVENTION

The present invention seeks to provide a modular ceiling kit comprising a luminaire arrangement and a mounting frame, wherein the luminaire arrangement comprises a luminaire having a first light exit window framed by a rim, and a component for the luminaire that can obscure the rim in a more effective manner.

According to an aspect, there is provided a modular ceiling kit comprising a luminaire arrangement and a mounting frame. The luminaire arrangement comprises a luminaire having a first light exit window framed by a rim. The mounting frame comprises an aperture for receiving the luminaire. The luminaire arrangement further comprises a component that is mountable in between the mounting frame and the luminaire. The component comprises a second light exit window delimited by a side wall arrangement extending away from the second light exit window. The component is dimensioned such that when the component is positioned on the luminaire, the component extends over the rim and the side wall arrangement creates a clearance between the first light exit window and the second light exit window.

Embodiments of the present invention are based on the insight that when providing an add-on component, e.g. a component that covers the first light exit window of the luminaire, a dark region around the perimeter of such a component can be avoided by spatially separating the second light exit window of the component from the first light exit window of the luminaire such that light escaping the luminaire through its first light exit window can spread through the clearance between the first light exit window and the second light exit window, thereby illuminating the perimeter of the second light exit window spatially corresponding to the rim of the luminaire and improving the overall appearance of the luminaire. This is achieved by the provision of a sidewall arrangement, i.e. a lip, extending away from the second light exit window such that upon engaging the component with the luminaire the sidewall arrangement ensures that such a clearance is formed between the first light exit window of the luminaire at the second light exit window of the component. The second light exit window typically has a larger area than the first light exit window, such that at least during use of the luminaire the rim is obscured, e.g. by illuminating the entire area of a recess of a modular ceiling in which the luminaire is mounted.

In one set of embodiments, the second light exit window comprises a translucent sheet from which the side wall arrangement extends. Such a translucent sheet obscures the first light exit window from direct view such that the overall appearance of the luminaire may be further improved. For example, such a component may act as the diffuser of such a luminaire in which case the luminaire itself does not require a diffuser, which may be advantageous in terms of the overall thickness of the luminaire as well as in terms of its manufacturing cost due to the fact that fewer components are required to manufacture the luminaire.

Such an add-on component may further be used for decorative purposes. To this end, a major surface of the translucent sheet opposite the clearance may carry at least one embossed shape, which may be any aesthetically pleasing shape such as a circular shape, ellipsoid shape, polygonal shape, freeform shape, a pattern of such shapes, and so on. Such components further may be used to periodically change the appearance of the luminaire by changing the component having a particular embossed shape for a component having a different embossed shape to keep the appearance of the luminaire interesting. As the design options for such an embossed shape are virtually endless, it will be understood by the skilled person that any suitable shape may be used for the embossing.

The at least one embossed shape may cover only part of the major surface, i.e. the embossed shape is not a surface texture of the translucent sheet.

The translucent sheet may comprise a stepped profile in a direction opposite to the direction in which the sidewall arrangement extends. This has the advantage that when the component is used with a luminaire mounted in a mounting frame of a modular ceiling, the stepped profile may extend through the recess in which the luminaire is mounted to give the impression of a protruding luminaire in the modular ceiling such that the luminaire becomes a design feature of the modular ceiling, which may be particularly attractive if the translucent sheet furthermore carries at least one embossed shape on its exposed major surface. Moreover, such a protruding component gives the appearance of the entire recess in the mounting frame being illuminated, i.e. gives the appearance of a rimless luminaire.

The component preferably is made of a polymer material such as polycarbonate, PMMA or PET, as such materials are transparent to radio waves, thereby facilitating the remote control of the luminaire whilst the component is engaged with the luminaire.

The sidewall arrangement may be optically transmissive and/or may comprise a reflective surface arrangement facing said clearance. The latter embodiment is particularly advantageous in case the sidewall arrangement is a curved or angled sidewall arrangement defining a cove delimiting said clearance such that light is reflected back from the sidewall arrangement into the cove, thereby yielding an arrangement having a particularly high optical efficiency and giving the appearance of a brightly lit cove. In this embodiment, the second light exit window may be an opening delimited by the sidewall arrangement through which the luminaire can be observed.

In the modular ceiling kit according to the present invention, the component may be advantageously used in combination with a luminaire mounted in a mounting frame of a suspended (modular) ceiling in which case the component simply may be sandwiched in between the mounting frame of the modular ceiling and the luminaire, thereby pushing the luminaire upwardly in the headspace between the modular ceiling and the actual ceiling of the space comprising the modular ceiling. In such an arrangement, the component does not require securing to the luminaire as the component is supported by the mounting frame, with the luminaire being supported by the component. However, embodiments of the present invention are not limited to luminaires in such modular ceilings.

The modular ceiling kit according to the present invention may further comprise a plurality of fastening members for fastening the component to the luminaire, such that the component may be fastened to a surface-mounted luminaire, e.g. a pendant luminaire hanging from a ceiling.

In the modular ceiling kit according to the invention, the luminaire may comprise a light guide having a major surface facing or defining the first light exit window, and may further comprise a plurality of solid state lighting elements arranged along at least one edge of the light guide as such types of luminaires typically comprise a frame or the like for holding the light guide, which frame typically comprises a rim covering the periphery of the major surface of the light guide facing or defining the first light exit window of the luminaire.

The modular ceiling kit according to the invention may be used to construct a modular ceiling in which the luminaires have a particularly pleasing appearance and in which the rim around the first light exit window of such luminaires is obscured as previously explained. Such a modular ceiling kit may further comprise a plurality of ceiling elements, e.g. surface tiles, for mounting in a plurality of further apertures of the mounting frame.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
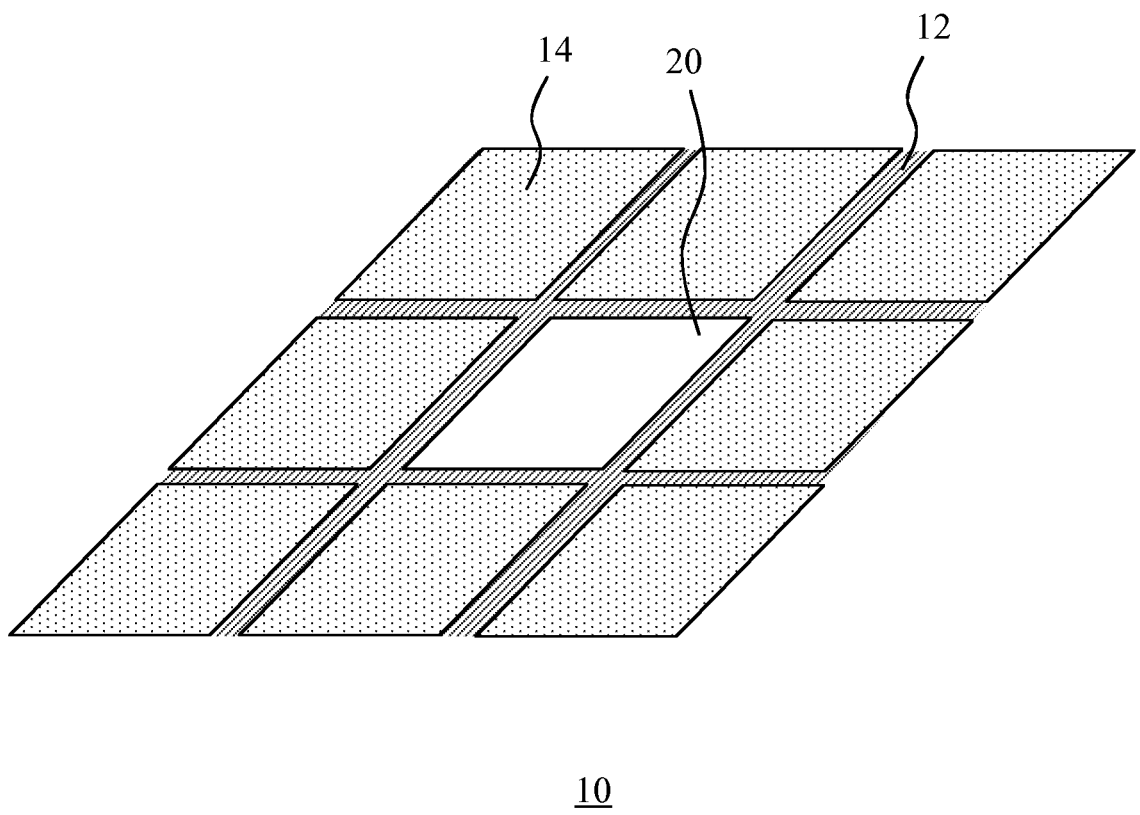
FIG. 1 schematically depicts part of a typical modular ceiling arrangement in a perspective view.

It should be understood that the Figures are merely schematic and are not drawn to scale. It should also be understood that the same reference numerals are used throughout the Figures to indicate the same or similar parts.

FIG. 1 schematically depicts a perspective view of part of a typical modular ceiling 10. Such a modular ceiling 10 typically is suspended from the actual ceiling of a space, e.g. an office space or the like, thereby creating a headspace between the actual ceiling and the modular ceiling 10. Such a headspace may be utilized to route cables or the like through conduits or alternatively the modular ceiling 10 is fitted for aesthetic reasons, e.g. to hide unsightly concrete ceiling surface or the like. Other reasons for fitting such a modular ceiling 10 will be well-known to the skilled person.

Such a modular ceiling 10 typically comprises a mounting frame 12 in which the elements making up the ceiling grid of the modular ceiling 10 are mounted. Such elements may include surface tiles 14, which may be made of any suitable material as is well-known per se, such that these surface tiles 14 will not be described in further detail for the sake of brevity only. The surface tiles 14 are typically mounted in recesses of the mounting frame 12, in which they are supported by the mounting frame 12. This for example may be achieved by dimensioning the surface tiles 14 such that they are slightly larger than the recesses and when inserted therein are supported by horizontal portions of the mounting frame 12. The modular ceiling 10 typically further comprises a number of luminaires 20 that may be suspended in the modular ceiling 10 in the same manner as the surface tiles 14, e.g. supported by horizontal portions of the mounting frame 12.

Figure 2:
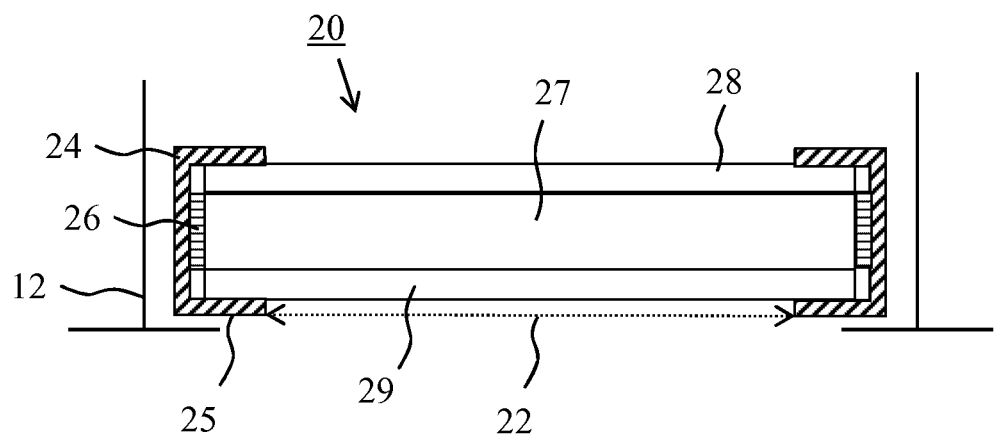
FIG. 2 schematically depicts part of a typical modular ceiling arrangement in a cross-sectional view.

FIG. 2 schematically depicts a cross-sectional view of such a luminaire 20 mounted in a mounting frame 12 of such a modular ceiling 10. The luminaire 20 comprises an optical stack including a light guide 27 having opposing major surfaces and at least one edge surface extending between these opposing major surfaces. The optical stack may further comprise a reflector 28 arranged on one of the opposing major surfaces of the light guide 27 and a diffuser 29 arranged on the other of the opposing major surfaces, with the diffuser 29 defining the first light exit window 22 of the luminaire 20.

The various components of the optical stack are typically clamped or otherwise held together in a frame or housing 24 of the luminaire 20, which frame may carry a plurality of solid state lighting (SSL) elements 26 arranged along at least one of the edge surfaces of the light guide 27 such that light emitted by the SSL elements 26 is coupled into the light guide 27 through at least one of its edge surfaces, with the light guide 27 typically comprising a pattern of outcoupling structures that are distributed across the light guide 27 such that a substantially homogeneous light output is produced by the light guide 27 towards the diffuser 29, with the diffuser 29 further homogenizing this light output. Light escaping from the light guide 27 towards the reflector 28 is reflected back into the light guide 27 by the reflector 28, thereby improving the luminous efficiency of the luminaire 20.

The frame or housing 24 typically comprises a rim 25 that covers a peripheral region of a major surface of the optical stack, e.g. of the diffuser 29 or the light guide 27 in case of the absence of such a diffuser 29, thereby reducing the overall area of the first light exit window 22 of the luminaire 20. At least part of the rim 25 may extend beyond the horizontal portion of the mounting frame 12 supporting the luminaire 20 such that when the luminaire 20 is in use, i.e. produces its luminous output, this part of the rim 25 appears as a dark frame around the luminaire 20, which typically contrasts with the mounting frame 12, as such frames are typically manufactured in light colours, e.g. in white, for aesthetic reasons, e.g. to give a space in which the modular ceiling 10 is fitted a bright appearance. When trying to hide the luminaire 20 from direct view, e.g. by fitting a decorative light panel between the luminaire 20 and the mounting frame 12 such that the first light exit window 22 and its surrounding rim 25 are covered by the decorative light panel, the peripheral region of the decorative light panel in contact with the rim 25 remains darker in appearance than the region of the decorative light panel over the first light exit window 22, such that such decorative light panels cannot produce a substantially homogeneous luminous output across the full area of the recess in the mounting frame 12 in which the luminaire 20 is mounted.

Figure 3:
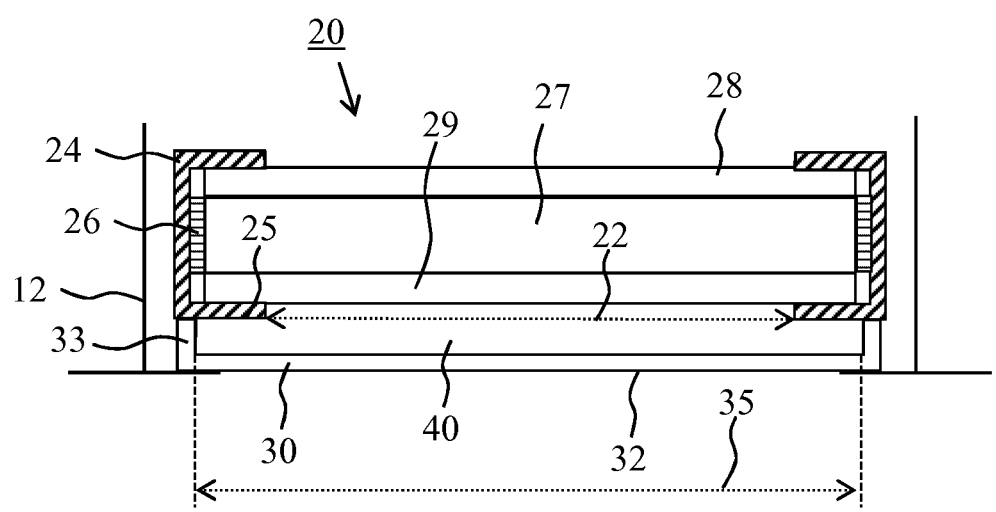
FIG. 3 schematically depicts an optical component in engagement with a luminaire.

FIG. 3 schematically depicts an optical component 30 that defines a second light exit window 35 having a larger area than the first light exit window 22 of the luminaire 20. The second light exit window 35 of the component 30 is delimited by a sidewall arrangement 33 that extends away from the plane in which the second light exit window 35 lies such that a clearance 40 is formed between the first light exit window 22 of the luminaire 20 and the second light exit window 35 of the component 30 when the component 30 is positioned on the luminaire 20. For example, where the luminaire 20 is suspended in a mounting frame 12 of a modular ceiling 10, the component 30 may be positioned in between the mounting frame 12 and the luminaire 20 such that the luminaire 20 is pushed upwardly into the headspace between the modular ceiling 10 and the actual ceiling from which the modular ceiling 10 is suspended. In such embodiments, the second light exit window 35 of the component 30 typically corresponds to the recess in the mounting frame 12 in which the luminaire 20 is mounted. The clearance 40 created between the first light exit window 22 of the luminaire 20 and the second light exit window 35 of the component 30 ensures that light exiting the first light exit window 22 can laterally spread in the clearance 40 such that the entire second light exit window 35 becomes illuminated, thereby obscuring the rim 25.

As depicted in FIG. 3, the component 30 further comprises a translucent sheet 32 defining the second light exit window 35, with the sidewall arrangement 33 extending from the translucent sheet 32. Preferably, the component 30 is a single component in which the sidewall arrangement 33 defines a lip or rim of the translucent sheet 32, wherein the sidewall arrangement 33 may engage with the rim 25 of the luminaire and a peripheral portion of the translucent sheet 32 may engage with the mounting frame 12 such that the luminaire 20 is pushed upwardly into the headspace above the modular ceiling 10 as previously explained. The sidewall arrangement 33 is shown to extend from the translucent sheet 32 in a perpendicular fashion by way of non-limiting example only; it should be understood that the sidewall arrangement 33 may extend from the translucent sheet 32 under any suitable angle, e.g. angles other than 90°.

The component 30 may be made of a translucent polymer material such as polycarbonate, PET or PMMA. Other suitable polymers will be immediately apparent to the skilled person. The advantage of using polymer materials is that the optical component is transparent to radio signals such that if the luminaire 20 comprises a wireless receiver or the like for receiving radio signals to control the luminaire 20, such radio signals can pass through the component 30 unimpeded. The use of such a polymer materials has the further advantage that the luminous efficiency of the luminaire 20 is only marginally reduced due to the high degree of transmissivity of such polymer materials. The component 30 may act as a diffuser of the luminaire 20, in which case the diffuser 29 may be omitted from the design of the luminaire 20.

Figure 4:
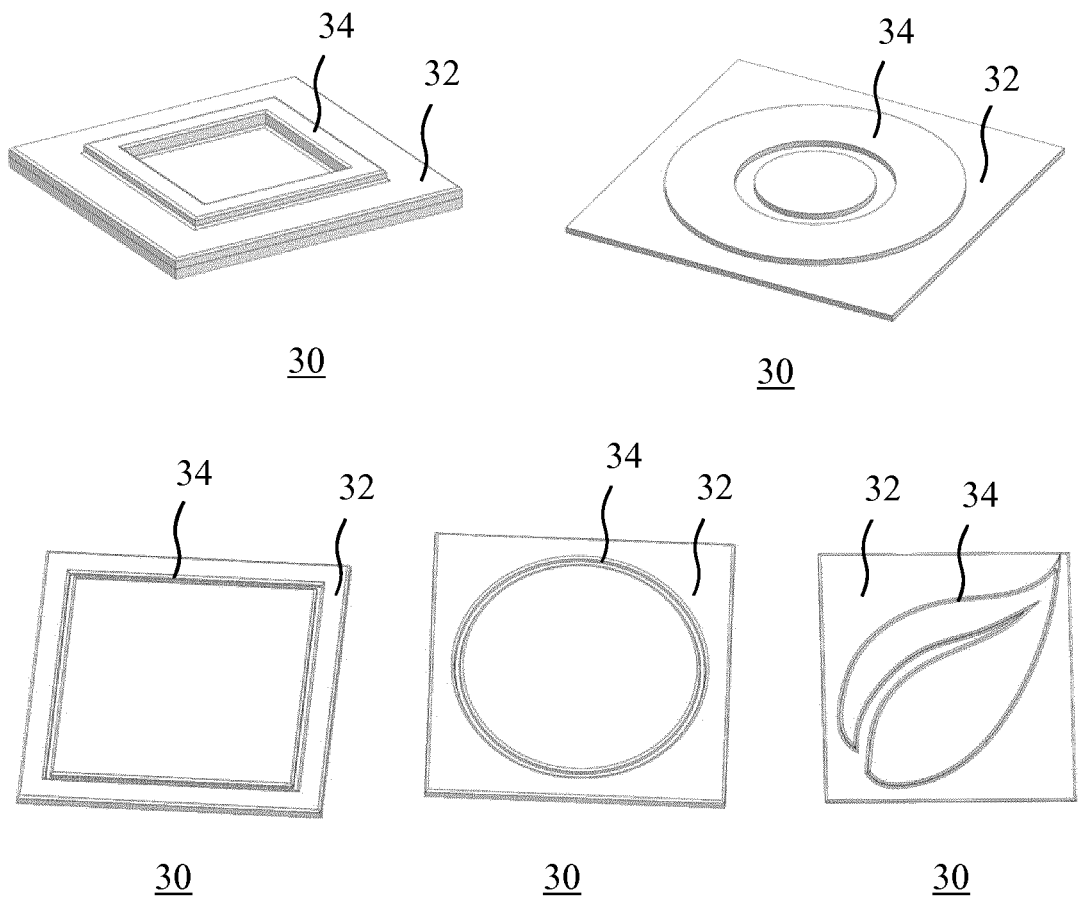
FIG. 4 schematically depicts non-limiting examples of such an optical component with decorative motifs.

The component 30 may further comprise at least one embossed shape on the exposed major surface of the translucent sheet 32 to increase the decorative appeal of the component 30. FIG. 4 schematically depicts a perspective view of a number of such embossed components 30 in which the exposed major surface of the translucent sheets 32 carry different embossed shapes 34. Such embossed components 30 may be manufactured in any suitable manner, e.g. using manufacturing processes such as thermoforming, (blow) molding, extrusion, milling, 3-D printing, and so on. The embossed shape 34 typically is a discrete shape on part of the exposed surface of the translucent sheet 32 such that only part of the exposed surface is covered by the embossed shape 34. In this respect, the component 30 comprising such an embossed shape 34 is distinguished from components carrying a surface texture as such textures typically cover the entire surface. It is furthermore noted that the exposed major surface of the translucent sheet 32 may comprise a plurality of such embossed shapes 34 and that embodiments of the present invention are not limited to embossed shapes 34 having a particular shape; it will be understood that the shapes that can be used are endless, and for example may include circular or elliptical shapes, polygonal shapes, free-form shapes, and so on.

In a particular embodiment, a plurality of components 30 may be provided having different embossed surfaces, i.e. carrying different embossed shapes. Because the component 30 is separate to the luminaire 20, i.e. is provided as an add-on, this facilitates the replacement of a particular component 30 from this plurality with another component 30 from this plurality in order to change the appearance of the luminaire 20 by changing the embossed shape on the exposed surface of the translucent sheet 32. In this manner, the appearance of the luminaire 20 may be periodically changed by replacement of the component 30, which aids the aesthetic appeal of the luminaire 20 over a prolonged period of time.

Figure 5:
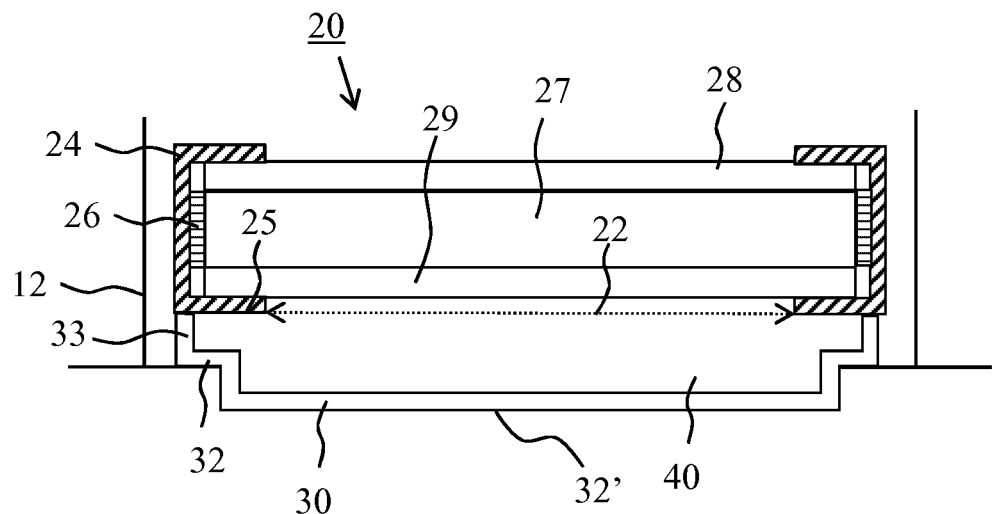
FIG. 5 schematically depicts an optical component in engagement with a luminaire.

FIG. 5 schematically depicts an alternative optical component 30 in which the translucent sheet 32 comprises a stepped profile in a direction that generally is opposite to the direction in which the sidewalls 33 extend from the translucent sheet 32, which stepped profile typically is dimensioned such that the translucent sheet 32 comprises a portion 32' flush with the mounting frame 12 that protrudes from the modular ceiling 10 through the recess in which the luminaire 20 is mounted. This gives the luminaire 20 a particularly prominent appearance within the modular ceiling 10, as its light emitting surface as defined by the component 30 protrudes from the modular ceiling 10, and give the appearance of a rimless luminaire 20, which is particularly aesthetically pleasing.

Figure 6:
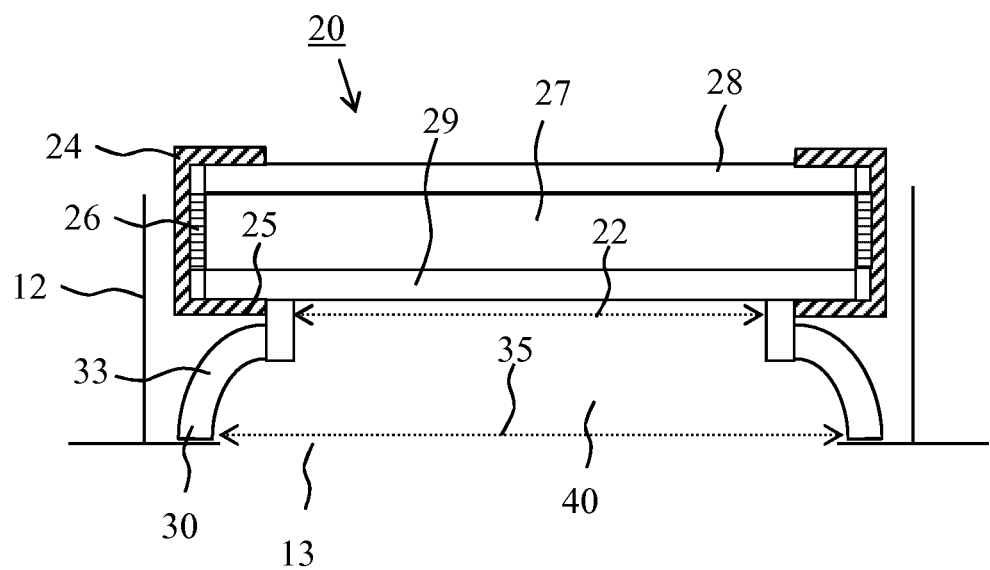
FIG. 6 schematically depicts an optical component in engagement with a luminaire.

Another example of the optical component 30 for use in a modular ceiling kit is schematically depicted in FIG. 6. In this example, the optical component 30 alters the original 2-D appearance of the luminaire 20 into a 3-D appearance. This is achieved by having a sidewall arrangement 33 in which the one or more sidewalls are angled or curved and delimit an opening acting as the second light exit window 35 opposite the first light exit window 22 of the luminaire 20. In this example, a first end portion of one or more sidewalls may engage with a region of the diffuser 29 or the light guide 27 in case of the absence of the diffuser 29 proximal to the rim 25, i.e. with a peripheral region of the first light exit window 22, such that the rim 25 is obscured by the sidewall arrangement 33. An opposing end portion of the sidewall arrangement 33 may be positioned on the mounting frame 12 such that the component 30 pushes the luminaire 20 into the headspace above the modular ceiling 10 as previously explained.

In this example, the component 30 may create a cove or the like around the first light exit window 22 of the luminaire 20 to make the luminaire 20 appear as having a cove-shaped optical chamber, i.e. the clearance 40. In order to improve the optical efficiency of such an optical chamber, the surfaces of the sidewall arrangement 33 facing the clearance 40 may be reflective such that light incident on the sidewall arrangement 33 is reflected back into the clearance 40. These surfaces of the sidewall arrangement 33 may be made reflective in any suitable manner, e.g. by a reflective coating such as a white paint coating thereon.

As before, the clearance 40 between the first light exit window 22 of the luminaire 20 and the second light exit window 35 defined by the opening delimited by the sidewall arrangement 33 opposite the first light exit window 22 ensures that light exiting the first light exit window 22 can spread over the entirety of the second light exit window 35, thereby giving the appearance of the entire recess 13 in the mounting frame 12 in which the luminaire 20 is mounted being illuminated by the luminaire 20, thereby avoiding a visible dark rim 25. The sidewall arrangement 33 of the component 30 may be made of any suitable material such as the aforementioned polymer materials, metal, wood, composite materials, and so on. It is noted that the material does not need to be transparent to radio signals as such radio signals can travel to the luminaire 20 through the opening defining the second light exit window 35 of the component 30.

Figure 7:
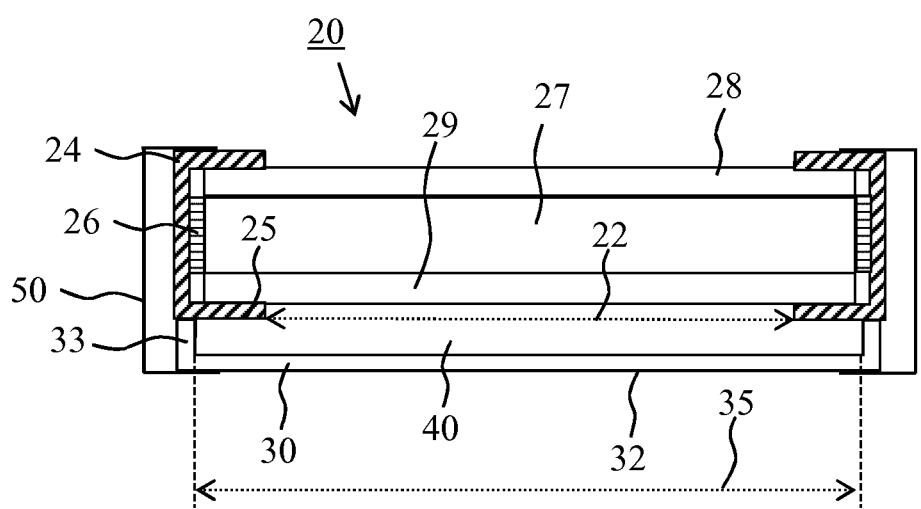
FIG. 7 schematically depicts an optical component kit in engagement with a luminaire.

In the above described embodiments, the component 30 is inserted as an add-on in between a luminaire 20 suspended in a modular ceiling 10 and the mounting frame 12 of the modular ceiling 10 such that the component 30 does not need to be affixed to either the luminaire 20 or the mounting frame 12. However, it should be understood that embodiments of the present invention are not limited to the modification of the appearance of luminaires suspended in modular ceilings. It is for example equally feasible to modify the appearance of a ceiling-mounted luminaire 20, e.g. a pendant luminaire 20 having a first light exit window 22 delimited by a rim 25 as previously explained. In such embodiments, a kit may be provided comprising the component 30 according to any of the embodiments described in this application together with a plurality of fixing members 50, e.g. clamps, mounting brackets, screws, and so on, which may be used to secure the component 30 against the luminaire 20 as schematically depicted in FIG. 7.

The component 30 may be used as an add-on for existing luminaires 20, e.g. to retrofit the component 30 to such luminaires, in which case the component 30 may be provided as a standalone entity. However, a luminaire arrangement may be provided instead in which a luminaire 20 is provided with one or more components 30, e.g. a plurality of components 30 having different embossed surface designs as previously explained, such that a newly installed luminaire 20 may be extended with such an add-on. For example, such an add-on component 30 may be used as a diffuser of such a luminaire 20 such that the optical stack of such a luminaire 20 does not need to comprise such a diffuser such that the thickness of the luminaire 20 can be reduced. Any suitable luminaire 20 may be used in such a luminaire arrangement, i.e. any type of luminaire 20 comprising a first light exit window 22 surrounded by a rim 25. Examples of suitable luminaires 20 include luminaires comprising a light guide 27 and a plurality of solid state lighting elements 26 arranged to couple light into the light guide 27, for example into one or more edge surfaces of the light guide 27 although other arrangements of coupling light into such a light guide 27, e.g. into a major surface of the light guide 27 are equally feasible.

Such a luminaire arrangement may form part of a modular ceiling kit further comprising a mounting frame 12 that when assembled comprises an aperture or recess 13 in which the luminaire 20 and the component 30 can be fitted as previously described. Such a modular ceiling kit may further comprise a plurality of surface tiles 14 for fitting in further apertures or recesses of the assembled mounting frame 12, which further apertures or recesses may have the same dimensions or may have different dimensions to the aperture or recess 13 in which the luminaire 20 and the component 30 are to be fitted.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A modular ceiling kit comprising a luminaire arrangement and a mounting frame,
   wherein the luminaire arrangement comprises a luminaire having a first light exit window framed by a rim,
   wherein the mounting frame comprises an aperture for receiving the luminaire,
   wherein the luminaire arrangement further comprises a component that is mountable in between the mounting frame and the luminaire,
   wherein the component comprises a second light exit window delimited by a side wall arrangement extending away from the second light exit window, and
   wherein the component is dimensioned such that when the component is positioned on the luminaire, the component extends over the rim and the sidewall arrangement creates a clearance between the first light exit window and the second light exit window.

2. The modular ceiling kit of claim 1, wherein the second light exit window comprises a translucent sheet from which the side wall arrangement extends.

3. The modular ceiling kit of claim 2, wherein a major surface of the translucent sheet opposite the clearance carries at least one embossed shape.

4. The modular ceiling kit of claim 3, wherein the at least one embossed shape covers only part of the major surface.

5. The modular ceiling kit of claim 2, wherein the translucent sheet comprises a stepped profile in a direction opposite to the direction in which the sidewall arrangement extends.

6. The modular ceiling kit of claim 2, wherein the component is a diffuser for the luminaire.

7. The modular ceiling kit of claim 2, wherein the component is made of a polymer material.

8. The modular ceiling kit of claim 1, wherein the sidewall arrangement comprises a reflective surface arrangement facing the clearance.

9. The modular ceiling kit of claim 8, wherein the sidewall arrangement is a curved or angled sidewall arrangement defining a cove delimiting the clearance.

10. The modular ceiling kit of claim 1, further comprising a plurality of fastening members for fastening the component to the luminaire.

11. The modular ceiling kit of claim 1, wherein the luminaire comprises a light guide having a major surface facing or defining the first light exit window.

12. The modular ceiling kit of claim 11, further comprising a plurality of solid state lighting elements arranged along at least one edge of the light guide.

13. The modular ceiling kit of claim 1, further comprising a plurality of ceiling elements for mounting in a plurality of further apertures of the mounting frame.

* * * * *